United States Patent Office 3,057,679
Patented Oct. 9, 1962

3,057,679
PRODUCTION OF LOWER VALENCE STATE HALIDES AND OXYHALIDES
James B. Culbertson, Lockport, and William B. Mattingly, North Tonawanda, N.Y., assignors to Union Carbide Corporation, a corporation of New York
No Drawing. Filed July 20, 1959, Ser. No. 828,002
5 Claims. (Cl. 23—87)

This invention relates to a process for the production of lower valence state, reactive, refractory metal halides or oxyhalides from the corresponding higher valence state halides or oxyhalides.

Lower valence state halides and oxyhalides are useful as catalysts in polymerization reactions, e.g., in the production of polyethylene. Their use for this purpose generally requires that they be in a substantially pure state so as to avoid undesirable reactions and product contamination.

One of the most commonly used methods for preparing these materials consists of reducing the corresponding higher valence state halide or oxyhalide to a lower valence state in the presence of hydrogen at temperatures on the order of 800° C. to 1200° C. However, severe corrosive conditions are encountered at these high temperatures and thus render this method generally undesirable.

Lower valence state halides and oxyhalides have also been produced by reducing the corresponding higher valence state materials at low temperatures by employing reducing agents such as zinc or aluminum. However, the use of such reducing agents results in the production of by-products which affects the purity of the product and simplicity of the process.

Accordingly, it is an object of this invention to provide a low temperature process for the production of lower valence state halides or oxyhalides of reactive, refractory metals from the corresponding higher valence state halides or oxyhalides wherein a product is obtained that is substantially free from undesirable contaminates.

Other aims and advantages of this invention will be apparent from the following description and appended claims.

In accordance with this invention, a process is provided for the production of a compound selected from the group consisting of halides and oxyhalides of a metal selected from the group consisting of titanium, vanadium, columbium, tantalum, molybdenum, and tungsten, which comprises introducing into a reaction vessel, under a protective atmosphere, the higher valence state compound corresponding to the selected-group member; introducing into the reaction vessel at room temperature hydrogen gas in a quantity sufficient to raise the pressure in the reaction vessel to at least 700 p.s.i.g., the total hydrogen employed during the reduction reaction being in excess of the stoichiometric requirements needed to reduce the higher valence state compound corresponding to the selected-group member to the desired lower valence state; heating the reaction vessel at the elevated pressure to a temperature above the melting point but below the boiling point of the higher valence state compound corresponding to the selected-group member, whereby a lower valence state compound and hydrogen halide are produced and removing hydrogen halide during the reduction reaction.

Any reaction vessel capable of being employed under controlled conditions of temperature and pressure can be used in the process of this invention.

The higher valence state halide or oxyhalide is introduced into the reaction vessel under a protective atmosphere, for example, under an inert atmosphere, such as argon, or under a protective atmosphere substantially non-reactive with the reactants at standard temperature and pressure, e.g., hydrogen. The reaction vessel is sealed and if an inert gas, such as argon, was used, the inert gas is removed, e.g., by hydrogen purging or any of the other commonly known procedures for such operations.

Hydrogen gas is introduced into the reaction chamber at room temperature until the hydrogen gas increases the pressure within the vessel to at least 700 p.s.i.g. The vessel is then heated at the elevated pressure to an elevated temperature above the melting point but below the boiling point of the higher valence state halide or oxyhalide introduced into the vessel. The metal-containing halide or oxyhalide during the reduction reaction is in a liquid state at the pressures and temperatures employed. However, upon reduction to a lower valence state, some of the lower valent metal halides or oxyhalides produced may be in a solid state at the temperature and pressure employed. The degree of reduction of the higher valence state material can be controlled by carefully controlling the temperature and pressure at which the reduction reaction is effected.

It is not necessary that the stoichiometric excess of hydrogen needed to reduce the higher valence state material to the desired lower valence be charged to the reaction vessel initially as long as sufficient hydrogen is charged to initiate the reaction. However, the total amount of hydrogen employed during the reduction reaction is in excess of the stoichiometric amount required to reduce the higher valence state halide or oxyhalide to the desired valence state.

In practicing this invention the hydrogen halide by-product can be removed from the reaction vessel in several ways. For example, an agent suitable for absorbing the hydrogen halide by-product evolved during the reduction reaction may be charged to the reaction vessel together with the higher valence state halide or oxyhalide. The agent is preferably separated from the halide or oxyhalide, thereby avoiding contamination of the product and the additional steps of separation and purification of the product obtained.

Included among the agents suitable for absorbing the by-product hydrogen halide are the alkali and alkaline earth metal oxides, alkaline earth metals, and zeolitic molecular sieves.

The agent employed for the absorption of evolved hydrogen halide must be present in an amount such that the agent will have a hydrogen halide capacity in excess of that necessary to remove any hydrogen halide evolved if the reduction reaction were to go to completion.

Other methods for removing the hydrogen halide by-product including venting the by-product from the reaction vessel and collecting the material in a sodium hydroxide trap.

The ability to carry out the production of a lower valence state halide or oxyhalide, in accordance with the process of this invention, results not only in a rapid and economical process but also in a pure product and high yields.

The following examples will serve to further illustrate the process of this invention.

*Example 1*

A 10-gram sample of molybdenum pentachloride (analyzing substantially 100 percent $MoCl_5$) and approximately 30 grams of calcium oxide, an agent for absorption of hydrogen chloride, were introduced simultaneously but separately into an autoclave under a protective atmosphere of argon. The autoclave was sealed and purged with hydrogen. Hydrogen was introduced at room temperature to give a total pressure of 800 p.s.i.g. in the autoclave; the temperature in the autoclave was then increased to 140° C. and held for a time sufficient to effect the reduction reaction. After the reaction was completed, the metal chloride was removed and analyzed. The metal chloride was found to contain 44.9 percent molybdenum and 54.98 percent chlorine, which is equivalent to substantially 100 percent trichloride of molybdenum, $MoCl_{3.02}$.

*Example II*

A 10-gram sample of tungsten hexachloride (analyzing substantially 100 percent $WCl_6$) and approximately 50 grams of calcium oxide, an agent for absorption of hydrogen chloride, were introduced simultaneously but separately into an autoclave under a protective atmosphere of argon. The autoclave was sealed and purged with hydrogen. Hydrogen was introduced at room temperature so as to give a total pressure of 700 p.s.i.g. in the autoclave; the temperature in the autoclave was then increased to 234° C. and held for a time sufficient to effect the reduction reaction. After the reaction was completed, the reduction products were removed and analyzed. The reaction products were found to contain 90.63 percent $WCl_2$ and 9.20 percent $WCl_4$. These products are easily separated from each other because of their different physical characteristics.

*Example III*

An 18-gram sample of columbium pentachloride (analyzing substantially 100 percent $CbCl_5$) and approximately 20 grams of calcium oxide, an agent for absorption of hydrogen chloride, were introduced simultaneously but separately into an autoclave under a protective atmosphere of argon. The autoclave was sealed and purged with hydrogen. Hydrogen was introduced at room temperature so as to give a total pressure of 1000 p.s.i.g. in the autoclave; the temperature in the autoclave was then increased to 222° C. and held for a time sufficient to effect the reduction reaction. After the reaction was completed, the reduction products were removed and analyzed. These products were found to contain 81.1 percent $CbCl_3$ and 17.5 percent $CbCl_5$.

*Example IV*

A 10-gram sample of columbium pentachloride (analyzing substantially 100 percent $CbCl_5$) and approximately 10 grams of magnesium metal, an agent for absorption of hydrogen chloride, were introduced simultaneously but separately into an autoclave under a protective atmosphere of argon. The autoclave was sealed and purged with hydrogen. Hydrogen was introduced at room temperature so as to give a total pressure of 1000 p.s.i.g. in the autoclave; the temperature in the autoclave was then increased to 222° C. and held for a time sufficient to effect the reduction reaction. After the reaction was completed the reduction products were removed and analyzed. The reduction products were found to contain 96.78 $CbCl_3$ and 3.2 percent $CbCl_5$.

*Example V*

A 15-gram sample of vanadium oxychloride (analyzing substantially 100 percent $VOCl_3$) and approximately 15 grams of magnesium metal, an agent for absorption of hydrogen chloride, were introduced simultaneously but separately into an autoclave under a protective atmosphere of argon. The autoclave was sealed and purged with hydrogen. Hydrogen was introduced at room temperature so as to give a total pressure of 1000 p.s.i.g. in the autoclave; the temperature in the autoclave was then increased to 137° C. and held for a time sufficient to effect the reduction reaction. After the reaction was completed the reduction products were removed and analyzed. These reaction products were found to contain 98.8 percent $VOCl_2$ and 1.15 percent $VOCl$.

*Example VI*

Five pounds of tungsten hexachloride (analyzing 97 percent $WCl_6$ and 3 percent $WCl_5$) were distributed under an atmosphere of argon, in thin layers on thirteen stainless steel trays in an autoclave. The vessel was sealed and purged with argon. Hydrogen was introduced until the pressure in the vessel reached 775 p.s.i.g. at room temperature. The vessel was then heated to 300° C. and maintained at this temperature for approximately seventeen hours, after which the vessel was partially depressurized to about 100 p.s.i.g. by venting the HCl byproduct through a neutralizing NaOH trap. The NaOH was titrated to determine the amount of HCl removed and, therefore, the degree of reduction of the $WCl_6$. The vessel was then repressurized with hydrogen to about 750 p.s.i.g. This procedure was repeated a number of times, at which point the reaction was terminated and the product removed and analyzed. The product was found to contain 71.9 percent tungsten and 27.3 percent chlorine, corresponding to 98 percent $WCl_2$.

What is claimed is:

1. A process for the production of a lower valence state molybdenum chloride compound having a valence state less than 5 from molybdenum pentachloride, which comprises introducing molybdenum pentachloride together with calcium oxide into a reaction vessel under the protection of argon; purging said reaction vessel of said argon with hydrogen; introducing into said reaction vessel at room temperature sufficient hydrogen to raise the pressure in said reaction vessel to about 800 p.s.i.g., the total hydrogen employed during the reduction reaction being in excess of the stoichiometric requirements needed to reduce said molybdenum pentachloride to the desired valence state; heating the reaction vessel to about 140° C., whereby a lower valence state compound of molybdenum chloride and hydrogen chloride are produced.

2. A process for the production of a lower valence state tungsten chloride compound having a valence state less than 6 from tungsten hexachloride, which comprises introducing tungsten hexachloride together with calcium oxide into a reaction vessel under the protection of argon; purging said reaction vessel of said argon with hydrogen; introducing into said reaction vessel at room temperature sufficient hydrogen to raise the pressure in said reaction vessel to about 700 p.s.i.g., the total hydrogen employed during the reduction reaction being in excess of the stoichiometric requirements needed to reduce said tungsten hexachloride to the desired valence state; heating the reaction vessel to about 234° C., whereby a lower valence state compound of tungsten chloride and hydrogen chloride are produced.

3. A process for the production of a lower valence state vanadium oxychloride having a valence state less than 5 from vanadium oxytrichloride which comprises introducing vanadium oxytrichloride together with magnesium metal into a reaction vessel under the protection of argon; purging said reaction vessel of said argon with hydrogen; introducing into said reaction vessel at room temperature sufficient hydrogen to raise the pressure in said reaction vessel to about 1000 p.s.i.g., the total hydrogen employed during the reduction reaction being in excess of the stoichiometric requirements needed to reduce said vanadium oxytrichloride to the desired valence state; heating the reaction vessel to about 137° C., whereby a lower valence state compound of vanadium oxychloride and hydrogen chloride are produced.

4. A process for the production of a lower valence state tungsten chloride compound having a valence state less than 6 from tungsten hexachloride, which comprises introducing tungsten hexachloride into a reaction vessel under the protection of argon; purging said reaction vessel of said argon; introducing into said reaction vessel at room temperature sufficient hydrogen to raise the pressure in said reaction vessel to about 775 p.s.i.g.; heating the reaction vessel to about 300° C.; partially depressurizing said reaction vessel to remove at least a substantial amount of hydrogen chloride from said reaction vessel; repressurizing said reaction vessel with hydrogen to a pressure of about 750 p.s.i.g.; repeating the steps of partially depressurizing and repressurizing said reaction vessel until the total amount of hydrogen employed is in excess of the stoichiometric amount needed to reduce said tungsten hexachloride to the desired valence state.

5. A process for the production of a lower valence state columbium chloride compound having a valence less than 5 from columbium pentachloride which comprises introducing columbium pentachloride together with a hydrogen chloride absorber selected from the group consisting of magnesium metal and calcium oxide into a reaction vessel under the protection of argon; purging said reaction vessel of said argon with hydrogen; introducing into said reaction vessel at room temperature sufficient hydrogen to raise the pressure in said reaction vessel to about 1000 p.s.i.g., the total hydrogen employed during the reduction reaction being in excess of the stoichiometric requirements needed to reduce said columbium pentachloride to the desired valence state; heating the reaction vessel to about 222° C., whereby a lower valence state compound of columbium chloride and hydrogen chloride are produced.

References Cited in the file of this patent

UNITED STATES PATENTS

| | | |
|---|---|---|
| 1,783,662 | Marx et al. | Dec. 2, 1930 |
| 2,677,607 | Graham et al. | May 4, 1954 |
| 2,706,153 | Glasser | Apr. 12, 1955 |
| 2,822,258 | Jordan | Feb. 4, 1958 |
| 2,891,857 | Eaton | June 23, 1959 |

FOREIGN PATENTS

| | | |
|---|---|---|
| 487,834 | Great Britain | June 22, 1938 |
| 1,038,545 | Germany | Sept. 11, 1958 |

OTHER REFERENCES

Perry: "Chemical Engineers' Handbook," pages 311–312, 3rd ed. (1950), McGraw-Hill Book Co., New York, N.Y.

Funk and Weiss: "Chemical Abstracts," vol. 52, No. 20, page 16964h, Oct. 25, 1958.

"Industrial and Engineering Chemistry," page 17A, June 1955.

Jacobson: "Encyclopedia of Chemical Reactions," vol. 2, page 130 (1948), Reinhold Pub. Corp., New York, N.Y.

Sinha: "Jour. of App. Chem.," vol. 7, No. 2, page i-92 (February 1957).

Mellor: "Comprehensive Treatise on Inorganic and Theoretical Chemistry," vol. 3, page 663 (1923), Longmans, Green & Co., New York, N.Y.